April 19, 1960  W. J. FOSTER  2,932,987

SERVO CONTROL MECHANISM

Filed Dec. 1, 1955

INVENTOR
William J. Foster
BY
J. C. Thorpe
ATTORNEY

United States Patent Office 2,932,987
Patented Apr. 19, 1960

2,932,987

SERVO CONTROL MECHANISM

William J. Foster, Largo, Fla., assignor to General Motors Corporation, Detroit, Mich., a corporation of Delaware Application December 1, 1955, Serial No. 550,365

5 Claims. (Cl. 74—674)

This invention relates to a servo mechanism and more particularly to a servo mechanism designed to utilize system error (misalignment between a reference input and a power-driven output) to control the driving application of power to an output device.

The invention has particular application to a servo mechanism adapted to eliminate error for a constant positional or a constant velocity input. Such a servo mechanism is what is known in the art as a class II servo. The open-loop transfer function of such a servo system, the ratio of the output to input, is characterized by two integrations; the system error necessarily being integrated twice until the controlled output is equal to the reference input and moving with the same velocity. However, in order for it to be a stable servo system, the open-loop transfer function also must contain a lead term containing a suitable time constant in the numerator.

A principal object of the invention is to provide an improved servo mechanism of the aforementioned type having a relatively simple error integrating control means which is relatively inexpensive to manufacture and maintain and effective to produce stabilized application of the driving power with zero misalignment error for constant positional or constant velocity reference input.

It is also a principal object of the invention to provide an improved servo mechanism, the parts of which are either hydraulic or mechanical.

The foregoing and other objects and advantages of the invention will be more thoroughly understood from the following description and the accompanying drawing, in which.

Figure 1:
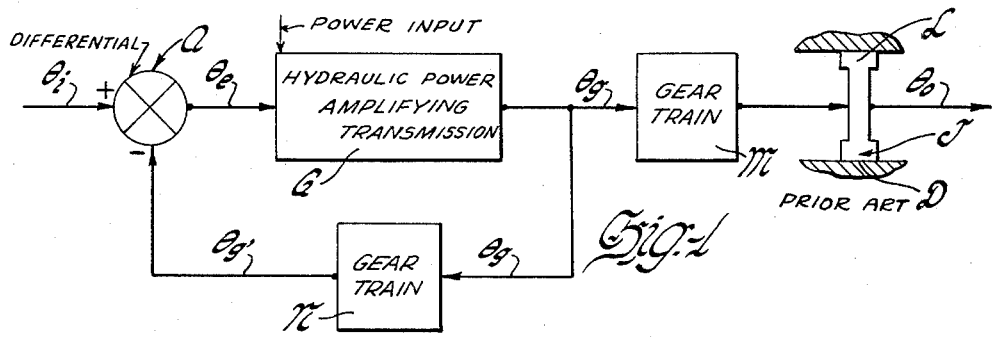
Figure 1 is a diagrammatic view of a class I servo mechanism of generally conventional construction.

Referring more particularly to the drawing, Figure 1 shows the closed loop of a class I servo mechanism including a differential device A adapted to sense or produce an error signal $\theta_e$ indicative of the difference in the positional and velocity relationship of a system input signal designated $\theta_i$ and a feedback signal $\theta_g'$. The error signal $\theta_e$ is utilized to control and standard commercially available servo power amplifier device such as a conventional hydraulic transmission G of the type having a variable-delivery pump which is driven by a suitable source of power and supplies driving fluid to a constant-displacement hydraulic motor; the error signal causing some component of the pump to be shifted in its position to vary the amount of fluid pumped and thereby the output position and load velocity signal of the motor which is designated as $\theta_g$. Such power amplifiers and the several components therefor are well known and highly developed in the art and consequently need not be shown or described in detail. However, such power amplifiers and their components are shown and described at pages 13–18 and 35–37, sections 5 and 10, chapter II of "An Introduction to the Theory of Control in Mechanical Engineering," R. H. MacMillan, University, Cambridge (1951). The transfer gain of the transmission G is mathematically represented by the term $$G = \frac{K}{s(as^2 + bs + 1)} \tag{1}$$

where the $s$ factor in the denominator denotes an integration. The motor output signal $\theta_g$ is, in turn, drivingly applied through a gear train indicated at M to a load device L, which is represented as possessing inertia J and damping D, and imparts a final output positional and velocity signal designated as $\theta_o$. The motor output signal $\theta_g$ is also fed back through suitable gearing N and is applied to the differential A as $\theta_g'$. As indicated above, the signal $\theta_g'$ is subtracted from $\theta_i$ to develop the error signal $\theta_e$.

Utilizing Laplace transforms to designate the operational interrelation of the several signals as transformed by the several components of the system, it will be seen that $$\theta_g = \theta_e G; \quad \theta_g' = \theta_g N; \quad \text{and} \quad \theta_e = \theta_i - \theta_g' = \theta_i - \theta_g N \tag{2}$$

Consequently, $$\theta_g = (\theta_i - \theta_g N)G \quad \text{and} \quad \theta_g(1 + NG) = \theta_i G \tag{3}$$

Therefore, the transfer function of the closed loop is $$\frac{\theta_g}{\theta_i} = \frac{G}{1 + NG} \tag{4}$$

However, if the feedback be disconnected from the differential, the open-loop transfer function is obtained as $$\frac{\theta_g'}{\theta_i} = GN = \frac{KN}{s(as^2 + bs + 1)} \tag{5}$$

As indicated above, the $s$ factor in the denominator denotes an integration, and its presence in the open-loop transfer function $\theta_g'/\theta_i$ indicates class I the servo mechanism of Figure 1 to be of a class I type. As such, it will have a constant lagging error for a constant velocity input but no error for constant positional input, because the integration keeps driving until the output comes to rest at the input position.

As indicated above, if the system error for constant velocity is to be zero, a second integration must be introduced. In servos having electrical inputs, this is usually obtained by utilizing a servo motor forward of the power amplifying device, i.e., the hydraulic transmission; the transfer function of such a servo motor being of the type $$G_m = \frac{K_m}{s(T_m s + 1)} \tag{6}$$

The product of this transfer function and that of G will give the necessary double integration ($s^2$ factor) in the open-loop transfer function; the new open-loop transfer function being $$GG_m N = \frac{KK_m N}{s^2(as^2 + bs + 1)(T_m s + 1)} \tag{7}$$

It will be noted that the numerator $KK_m N$ lacks a lead term with a suitable time constant and, as indicated above, such a system is unstable due to insufficient phase margin.

The transfer function of a stable system will take the form $$\frac{\theta_g'}{\theta_i} = \frac{KK_m N(T_h s+1)}{s^2(as^2+bs+1)(T_m s+1)} \quad (8)$$

where $T_h$ is the largest time constant in the system. Normally, the $T_h s+1$ term is supplied to the numerator by introducing some sort of error-rate device, such as a differential generator or an electrical network. However, such electrical components are relatively expensive to manufacture and maintain and are particularly susceptible to changes in their operation environment.

The invention herein described relates to the use of a device for obtaining an integration and for introducing a time constant lead term in the numerator of an open-loop transfer function of a servo mechanism by essentially mechanical means. While the invention is considered applicable to servo mechanism generally, it has particular application to a class II servo mechanism as indicated above, and for the purpose of illustration, is described in such an embodiment with reference to Figures 2 and 3 of the drawing.

Figure 2:
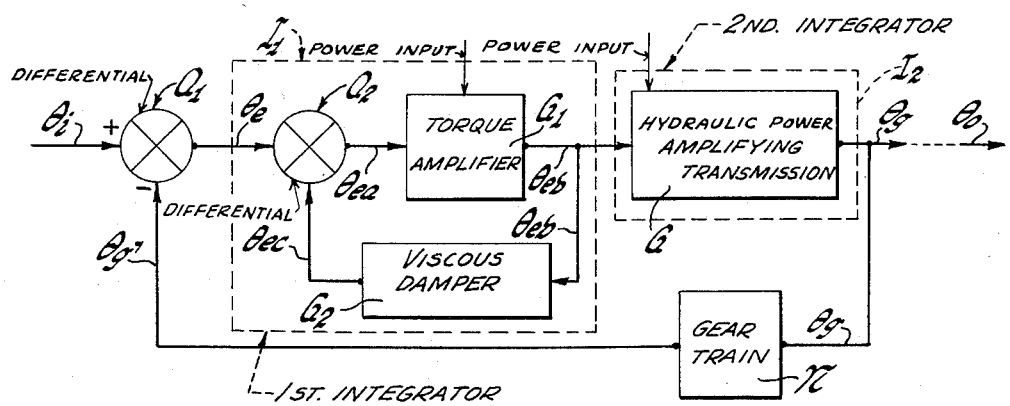
Figure 2 is a diagrammatic view showing the modification of the class I servo mechanism of Figure 1 to provide a class II servo mechanism constructed in accordance with the invention.
Figure 3:
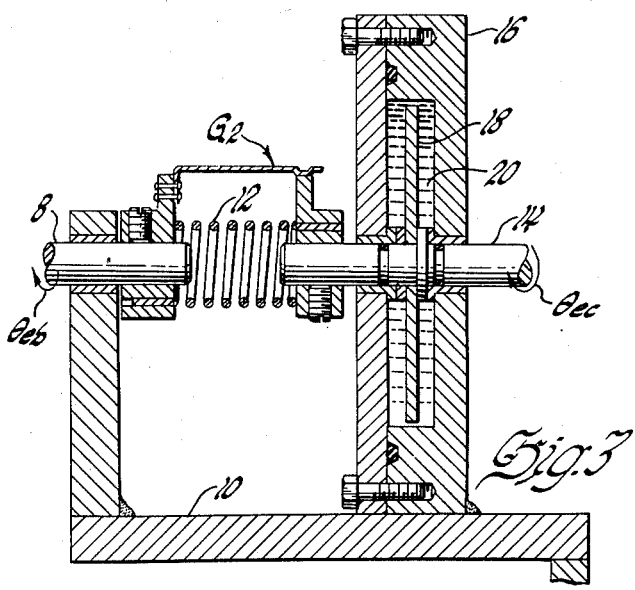
Figure 3 is a detailed sectional view showing a preferred configuration of an element adapted to be used to perform the first integration in the servo mechanism of Figure 2.

Figure 2 shows a class II servo mechanism constructed in accordance with the invention and including a differential device $A_1$ adapted to generate an error signal $\theta_e$ indicative of the misalignment between the position and velocity of a system input signal $\theta_i$ relative to an output signal $\theta_g$ of an output device; the output signal $\theta_g$ being fed back to the differential device $A_1$ through suitable gearing N as a signal $\theta_g'$. The error signal $\theta_e$ is integrated simultaneously and continuously by two integrating means or mechanisms designated generally as $I_1$ and $I_2$ to control the driving application of power of the output device. The output signal $\theta_g$ is adapted to drive a load device and is generated by a conventional servo power amplifier G such as a hydraulic transmission similar to that described with reference to Figure 1; such a hydraulic transmission having an error-controlled, variable-delivery pump supplying fluid to a constant-displacement hydraulic motor and the amount of fluid pumped governing the motor operation. As before, the servo power amplifier G provides an integration of the system error and in the instant application serves as the second integrating means $I_2$.

The first integration of the error signal is provided by the integrating means $I_1$ which is interposed between the differential $A_1$ and the transmission G. The integrating means $I_1$ includes a differential sensing device $A_2$ adapted to combine the error signal $\theta_e$ with a regenerative feedback signal $\theta_{ec}$ to produce a control signal $\theta_{ea}$. The signal $\theta_{ea}$ is, in turn, transformed through a torque-amplifying device $G_1$ having a transfer function equal to one to a control signal $\theta_{eb}$ equal to the signal $\theta_{ea}$ in position and velocity but of amplified torque. The torque amplifier $G_1$ may be of any suitable conventional type such as disclosed in United States Patent 2,586,941 Gretener et al., or at pages 27–32, sec. 8, chapter II of "An Introduction to the Theory of Control in Mechanical Engineering," supra. As will be noted from these reference, such torque amplifiers necessarily include a power source which is controllable by the input torque signal to provide an amplified torque output signal. Such torque amplifying devices are well known in the art and are commercially available, and are therefore not shown and described in detail. The signal $\theta_{eb}$ is utilized to control the servo-power-amplifying device G and is fed back to the differential $A_2$ as the signal $\theta_{ec}$ through a spring biased damper mechanism $G_2$, best shown by Figure 3, which integrates the error signal and introduces the necessary time phase factor into the transfer function of the servo system.

The spring-biased damper mechanism $G_2$ includes a shaft 8 adapted to be driven by the signal $\theta_{eb}$. The shaft 8 is rotatably mounted in a support assembly 10 and is resiliently connected by a torsion spring 12 to a second shaft 14. The shaft 14 is rotatably mounted by a housing 16 in spaced coaxial relation relative to the shaft 8, and a thin disc 18 rigidly mounted on the shaft 14 is spacedly embraced by the housing 16. The housing is filled with a viscous damping fluid 20 such as silicone and is mounted on the support assembly 10.

Utilizing the symbol D as the damping factor between the housing 16 and the disc 18 due to the fluid 20 and the symbol $K_2$ as the rate of the torsional spring 12 expressed in foot pounds per radian, the transfer function $\theta_{ec}/\theta_{eb}$ of the spring damping device $G_2$ is derived as follows:

$$K_2(\theta_{eb}-\theta_{ec}) = D\theta_{ec}s \quad (9)$$

Transposing (9), $$K_2\theta_{eb} = (Ds+K_2)\theta_{ec} \quad (10)$$

Consequently, the transfer function of the device $G_2$ $$\frac{\theta_{ec}}{\theta_{eb}} = \frac{K_2}{Ds+K_2} = \frac{1}{\frac{D}{K_2}s+1} = G_2 \quad (11)$$

and substituting $$T_2 = \frac{D}{K_2} \text{ in } (10)$$

$$G_2 = \frac{1}{T_2 s+1} \quad (12)$$

The transfer function $\theta_2/\theta_e$ for the open loop of the overall class II servo system shown in Figure 2 is readily found as follows:

$$\theta_{ec} = \theta_{eb}G_2 \text{ and } \theta_{ea} = \theta_e + \theta_{ec} \quad (13)$$

Hence, $$\theta_{ea} = \theta_e + \theta_{eb}G_2 \quad (14)$$

Since $G_1 = 1$; $\theta_{ea} = \theta_{eb}$. Substituting this relationship in (14)

$$\theta_{ea}(1-G_2) = \theta_e \text{ and } \theta_{eb} = \frac{\theta_e}{1-G_2} \quad (15)$$

As $$\theta_2 = \theta_{eb}G \quad (16)$$

substituting (15) in (16) indicates that $$\theta_2 = \frac{\theta_e G}{1+G_2} \quad (17)$$

Consequently, the transfer function for the open loop of the servo system $$\frac{\theta_2}{\theta_e} = \frac{G}{1-G_2} \quad (18)$$

Multiplying numerator and denominator by $$\frac{1}{GG_2}$$

it is found that $$\frac{\theta_2}{\theta_e} = \frac{\frac{1}{G_2}}{\frac{1}{GG_2}-\frac{1}{G}} \quad (19)$$

Substituting (1) for G and (12) for $G_2$, $$\frac{\theta_2}{\theta_e} = \frac{T_2 s+1}{\frac{s(as^2+bs+1)}{K_1}(T_2 s+1)-\frac{s(as^2+bs+1)}{K}} \quad (20)$$

$$= \frac{K(T_2 s+1)}{s(as^2+bs+1)T_2 s+s(as^2+bs+1)-s(as^2+bs+1)} \quad (21)$$

$$= \frac{\frac{K}{T_2}(T_2 s+1)}{s^2(as^2+bs+1)} \quad (22)$$

Thus, it will be seen that the use of the spring-biased damper mechanism $G_2$ in accordance with the invention introduces an integration to the open-loop transfer function of the system as well as introducing a stabilizing time constant in the numerator.

It has been stated that a lead term, or numerator time constant, is necessary to maintain stability in a class II system. This is due to the fact that each integration introduces a phase lag of output to input of 90°. This can be stated otherwise as reducing the phase margin of the output by 90°. It is well known that a satisfactory servo should have a maximum open-loop phase margin of at least 45° but the two integrations of a class II system tend to reduce the phase margin to 0°. The introduction of denominator time constants in the open-loop transfer function tend to reduce the phase margin still more. However, numerator time constants will tend to increase the phase margin. By a proper balance of such time constants, it is possible to achieve the necessary phase margin. From the mathematical derivations above, particularly (12) and (22), it will be apparent to those skilled in the art that the proper balance of these time constants is dependent upon the mechanical impedance or damping effect introduced into the system by spring-biased damping device, i.e., the rate $K_2$ of the spring 12, the damping effect D of the viscous fluid, and the incidental friction of the device.

The operation of the above-described class II servo mechanism presumably will be clear from the foregoing description but is outlined briefly below.

Any difference between the reference input $\theta_i$ and the power-driven output $\theta_o$ results in the generation of an error signal $\theta_e$ by the differential $A_1$. This signal error is combined with the signal $\theta_{ec}$ by the second differential $A_2$ to produce the output amplifying control signal $\theta_{ea}$, or $\theta_{eb}$ as amplified by $G_1$; the signal $\theta_{ec}$ representing regenerative feedback of the power-amplifying control signal $\theta_{eb}$ through the spring-biased viscous damper device $G_2$. Thus, with any change in the position or velocity of the input $\theta_i$, the error signal $\theta_e$ developed is subjected to a first and second integration by the integrating means $I_1$ and $I_2$ and the integrated error signal serves to control the driving application of power through the transmission G to thereby effect zero positional and zero velocity error between the input and output when the system has stabilized.

While only a specific embodiment of the invention has been shown and described for the purposes of illustration, it will be appreciated by those skilled in the art that the invention may be used in other types of mechanisms requiring the integration of a signal accompanied by a modification of the phase lag between output and input introduced by such an integration. Accordingly, it is to be understood that the foregoing is to be considered illustrative only and in no way restrictive; reference being had to the appended claims to determine the spirit and scope of the invention.

I claim:

1. In a control mechanism, a signal transmitting device including a first shaft rotatably mounted in a supporting structure and adapted to be driven by a rotational control signal, a second shaft rotatably mounted by said supporting structure, resilient means drivingly interconnecting said shafts whereby rotation of said first shaft tends to impart a similar rotation in said second shaft, means associated with said supporting structure and said second shaft for damping the tendency of said second shaft to rotate with said first shaft, and a differential mechanism operable to compare said control signal with a rotational input signal delivered to said mechanism to develop an error signal, and means for amplifying said error signal to achieve said control signal.

2. A mechanical integrating device including a differential adapted to combine a rotational input signal with a feedback signal to achieve an integrated control signal, a torque amplifier having a transfer function equal to unity for amplifying the torque of said control signal without misalignment, and a regenerative feedback mechanism interconnecting the output of said amplifier with said differential and applying said feedback signal thereto, said feedback mechanism including a first shaft journaled in a supporting structure and adapted to be rotatably driven by the output signal of said amplifier, a second shaft drivingly connected to said differential, a housing secured to said supporting structure and journaling said second shaft, torsional spring means resiliently interconnecting said shafts whereby rotation of said first shaft tends to impart a similar rotation to said second shaft, a member secured to said second shaft within said housing, and means intermediate said housing and said member for damping the rotation of said second shaft with respect to said first shaft to thereby introduce a time phase relationship between said input and feedback signals.

3. In a control mechanism, an integrating device comprising, in combination, means for amplifying a control signal, differential means adapted to achieve said control signal by integrating an input signal with a regenerative feedback of the output signal of said amplifying means, and means for applying the output signal of said amplifying means to said differential means in out-of-phase relationship to said input signal, said last-mentioned means including a member adapted to be driven by the output signal of said amplifier, a second member drivingly connected to said differential means, spring means resiliently interconnecting said members whereby movement of said first member tends to impart a similar movement to said second member, and means associated with said second member for damping the movement thereof with respect to said first member to thereby introduce said out-of-phase relationship between said input and feedback signals.

4. A control mechanism comprising means for controlling the application of driving power to a load device and means for developing and amplifying a signal controlling said first-mentioned means to drive said load device with zero positional and velocity error with respect to a reference input; said last-mentioned means including differential means, a first feedback means interconnecting said load device with said differential means and applying a feedback signal thereto indicative of the position and velocity of the load device, and a second feedback means supplying regenerative feedback of the amplified controlling signal to the differential means, the differential means being adapted to integrate the reference input signal with the feedback signals to achieve the desired controlling signal; and said last-mentioned feedback means including a first shaft journaled in a supporting structure and adapted to be rotatably driven by said amplified controlling signal, a second shaft drivingly connected to said differential means, spring means resiliently interconnecting said shafts whereby rotation of said first shaft tends to impart a similar rotation to said second shaft, and means associated with said second shaft for damping the rotation of said second shaft with respect to said first shaft to thereby introduce a time phase relationship between said input and feedback signals.

5. In a servo mechanism including a hydraulic transmission, means controlling said transmission to limit the application of driving power to a load device in accordance with a controlling signal to achieve zero positional and velocity error with respect to a constant velocity reference input signal, said transmission controlling means including a first differential feedback means adapted to produce an error signal indicative of the difference in the position and velocity of the load device with respect to the input signal, means for amplifying said error signal, and a second differential feedback means integrating the amplified error signal with said error signal to achieve the desired transmission controlling signal, said last-mentioned feedback means including a first shaft journaled in a supporting structure and adapted to be rotatably driven by said amplified error signal, spring means resiliently interconnecting said first shaft to a second shaft whereby rotation of said first shaft tends to impart a similar rotation to said second shaft, and means associated with said second shaft for damping the rotation of said second shaft with respect to said first shaft to thereby introduce a time phase relationship in the transfer function of said shafts.

References Cited in the file of this patent

UNITED STATES PATENTS

| | | |
|---|---|---|
| 1,962,367 | Smythe | June 12, 1934 |
| 2,049,375 | Henderson | July 28, 1936 |
| 2,586,941 | Gretener et al. | Feb. 26, 1952 |

FOREIGN PATENTS

| | | |
|---|---|---|
| 349,906 | Great Britain | May 26, 1931 |

UNITED STATES PATENT OFFICE
Certificate of Correction

Patent No. 2,932,987 April 19, 1960

William J. Foster

It is hereby certified that error appears in the printed specification of the above numbered patent requiring correction and that the said Letters Patent should read as corrected below.

Column 1, line 63, for "and standard" read —any standard—; column 3, lines 59 and 60, for "reference" read —references—; column 4, lines 46 to 48, for $$\theta_2 = \frac{\theta_e G}{1+G_2} \quad (17) \qquad \text{read} \qquad \theta_2 = \frac{\theta_e G}{1-G_2} \quad (17)$$

Signed and sealed this 20th day of September 1960.

[SEAL]

Attest:
KARL H. AXLINE,
*Attesting Officer.*

ROBERT C. WATSON,
*Commissioner of Patents.*